Nov. 2, 1965

G. M. HOLLEY, JR 3,215,042

INFINITELY VARIABLE SPEED DRIVES

Filed Jan. 15, 1962

INVENTOR.
GEORGE M. HOLLEY JR.
BY
ATTORNEYS

Nov. 2, 1965   G. M. HOLLEY, JR   3,215,042
INFINITELY VARIABLE SPEED DRIVES
Filed Jan. 15, 1962   3 Sheets-Sheet 3

INVENTOR.
GEORGE M. HOLLEY JR
BY
ATTORNEYS

__UNITED STATES PATENT OFFICE__

3,215,042
Patented Nov. 2, 1965

---

3,215,042
INFINITELY VARIABLE SPEED DRIVES
George M. Holley, Jr., Grosse Pointe, Mich., assignor to Holley Carburetor Company, Warren, Mich., a corporation of Michigan
Filed Jan. 15, 1962, Ser. No. 166,123
6 Claims. (Cl. 91—36)

The present invention relates to infinitely variable speed drives, and more particularly to a hydro-mechanical variable speed drive.

Stepless infinitely variable drives of the mechanical type are well known in the art. More recently, there has been developed a stepless drive as shown in Rouverol Patent No. 2,951,384 which is an improvement over prior drives of this kind, and in which a ball or cylinder transmits torque between spring or otherwise loaded input and output discs.

It is an object of the present invention to provide a stepless or infinitely variable speed drive mechanism wherein a fractional horsepower transmission of the Rouverol or other type may be employed in combination with a hydraulic servo mechanism to provide an overall system capable of horsepower outputs much greater than that of the variable speed drive unit employed to control the servo mechanism. The horsepower output of this system is dependent not upon the horsepower capacity of the variable speed drive unit, but upon the output of the servo mechanism which may be as large as required.

More specifically, it is an object of the present invention to provide a rotary control device, infinitely variable means for controlling the speed of said device, a servo mechanism including a movable servo valve, means connecting the servo valve to said rotary control device, and means for connecting said servo mechanism to a rotary output shaft.

It is a feature of the present invention to provide a plurality of servo mechanisms controlled as aforesaid, and positive drive means for connecting said servo mechanisms to a rotary output shaft.

Still more specifically, it is a feature of the present invention to provide a plurality of servo mechanisms controlled as aforesaid including reciprocable pistons, crank means connecting said pistons respectively to rotary gears, and gearing connecting said rotary gears to a single output shaft.

Other objects and features of the invention will become more apparent as the description proceeds, especially when taken in conjunction with the accompanying drawings, illustrating a preferred embodiment of the invention, wherein.

Figure 1:
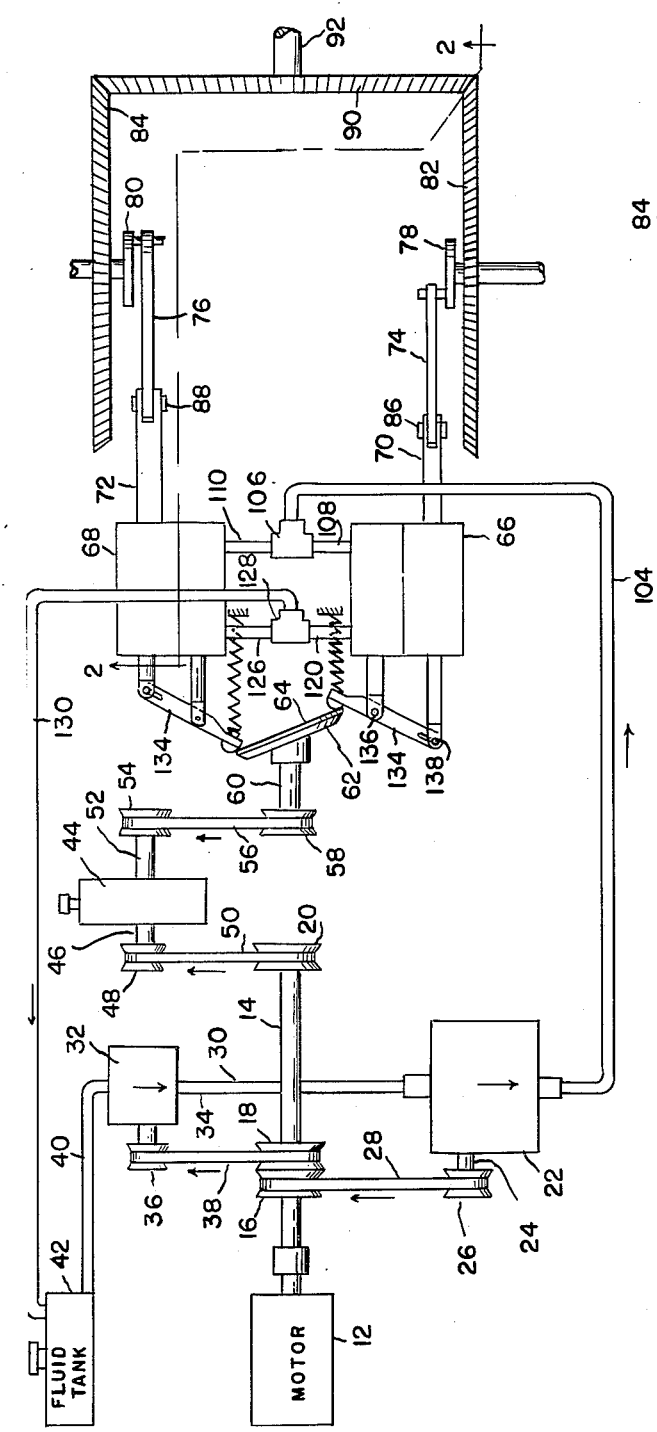
FIGURE 1 is a schematic view of the drive system of the present invention.
Figure 2:
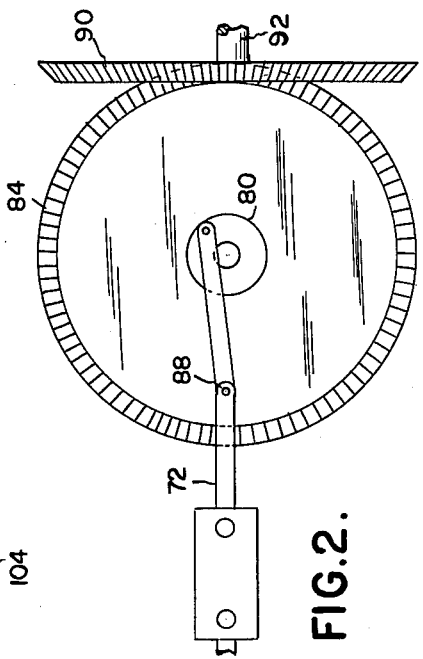
FIGURE 2 is a fragmentary section on the line 2—2, FIGURE 1.

Referring first to FIGURE 1, the variable speed system or mechanism comprises any suitable power source such as an electric motor 12 connected to a drive shaft 14 having sheaves 16, 18 and 20 fixed thereto. A constant pressure variable delivery on demand pump 22 includes a drive shaft 24 carrying a sheave 26 driven from the sheave 16 by the belt 28. Pumps of this type are well known and may be of the construction disclosed in the patent application of L. S. Keil, Serial No. 186,166, filed April 9, 1962, now Patent No. 3,118,381, assigned to the assignee herein. A suitable constant pressure variable delivery pump will be later described herein.

Connected to the constant pressure variable delivery pump 22 by a conduit 30 is an impeller pump 32 having a drive shaft carrying a sheave 36 connected to the sheave 18 by a belt 38. Impeller pump 32 is connected by conduit 40 to fluid supply tank or reservoir 42 and its function is to insure adequate supply of hydraulic fluid at the intake of the constant pressure variable delivery pump 22 so as to prevent scavenging. A variable speed transmission assembly 44 is provided having an input shaft 46 connected to a sheave 48 which is driven from the sheave 20 by the belt 50. The variable speed transmission 44 includes an output shaft 52 carrying a sheave 54 which is connected by a belt 56 to the sheave 58 of a shaft 60 carrying a cam or wobble plate 62. The plate 62 is provided with a flat surface 64 for a purpose which will subsequently be described.

The motor 12 is a constant speed motor and accordingly, the input shaft 46 of the variable speed transmission will be driven at a constant predetermined speed. The variable speed transmission, as previously mentioned, may be of the friction type wherein a ball or roller is pressed between the flat sides of two rotatable opposed members or discs which are rotatable on axes displaced out of alignment with respect to each other. By controlling the position of the ball or roller the speed of the output shaft 52 may be any predetermined fraction or multiple of the speed of the input shaft, within practical limits, and may of course be brought to rest or reversed while the input shaft continues to rotate. Inasmuch as the input shaft rotates at constant speed, so also does the output shaft of the variable speed transmission rotate at a constant speed which may be adjusted to any desired speed within practical limits.

In order to develop a power output independent of the power of the output shaft 52 of the variable speed transmission 44, servo mechanism including servo motors indicated generally at 66 and 68 is provided. Servo motors 66 and 68 include piston rods 70 and 72 which are reciprocated by the servo motors, the rods being connected by connecting rods 74 and 76 to cranks 78 and 80 fixedly connected to bevel gears 82 and 84 respectively. The connecting rods 74 and 76 are provided with pivot connections 86 and 88 respectively with the piston rods 70 and 72. Bevel gears 82 and 84 are in mesh with a third bevel gear 90 carrying the output shaft 92 of the system.

It will be appreciated that the output of the individual servo motors is reciprocatory in nature and this reciprocatory motion is converted to rotary motion by the cranks and gearing. While the servo motors are illustrated as substantially 180 degrees out of phase with respect to each other, this showing is made for clarity and in practice it is preferred to provide the servo motors and the connections to the rotary drive means 90 degrees out of phase so as to ensure starting in the correct direction and to equalize the torque applied to the output shaft 92.

Figure 3:
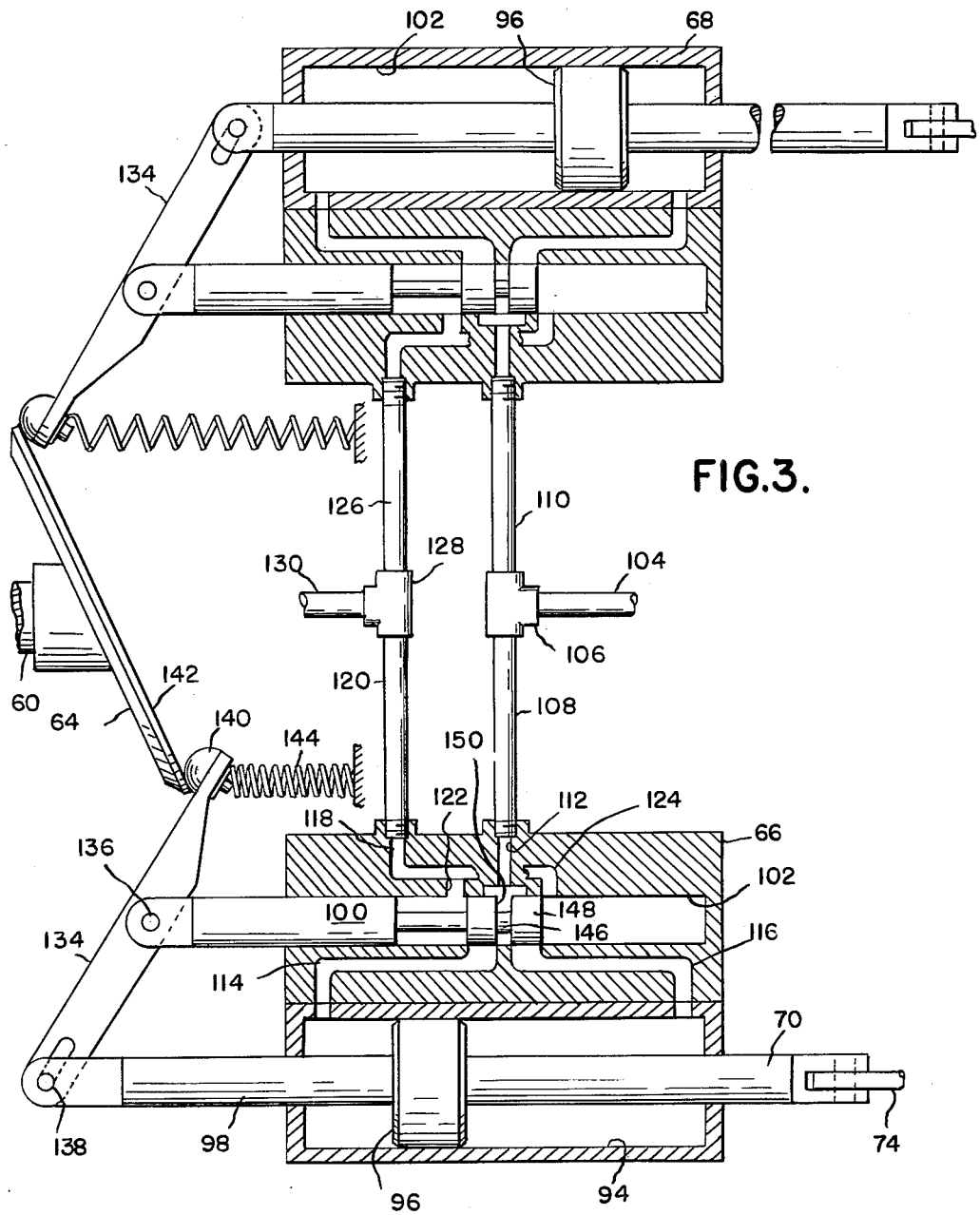
FIGURE 3 is a cross-sectional view through the servo mechanism.

Referring now to FIGURE 3, the construction of suitable servo mechanism is illustrated in detail. In this figure the wobble plate 64 is illustrated in a position such that the reciprocating elements of the servo motors are in limiting positions. Again, attention is directed to the fact that preferably the servo motors will be connected 90 degrees out of phase rather than 180 degrees out of phase as illustrated in the figure. The servo motors 66 and 68 are identical in construction and accordingly, only one of the motors will be described in detail. The servo motor 66 shown in the lower portion of FIGURE 3 comprises a main power cylinder 94. Movable in the cylinder 94 is the piston 96 to which the piston rod 70 is connected. Extending from the piston 96 in the opposite direction is a piston rod 98 which assists in actuation of the servo valve as will subsequently appear.

The servo motor 66 includes a piston type valve 100 slidable in a valve cylinder 102 which is ported for control of hydraulic pressure to and exhaust from the power cylinder 94. Hydraulic fluid under pressure is supplied through a conduit 104 to a T-connection 106 and thence by conduits 108 and 110 to the servo devices 66 and 68. Communicating with the pressure supply conduit 108 is a passage 112 terminating in a laterally enlarged port at the inner side of the valve cylinder 102. Separated passages 114 and 116 lead from axially spaced ports at the interior of the valve cylinder 102 to opposite end portions of the power cylinder 94. An exhaust passage 118 communicates with exhaust conduit 120 and has branches 122 and 124 terminating in outlet or exhaust ports at the interior of the valve cylinder 102. Exhaust conduit 120 and a similar exhaust conduit 126 leading from servo motor 68, connect through a T 128 with the main exhaust conduit 130 which returns fluid to the tank 42.

The valve 100 is connected to an arm or lever 134 by a pivot connection 136. One end of the the arm 134 is connected by a pin and slot connection 138 to the outer end of the piston rod 98. The opposite end of the arm 134 includes a convex contact head 140 engageable with the flat surface 142 at one side of the wobble plate 64. A compression spring diagrammatically indicated at 144, is provided to bias the arm 134 in the direction to maintain contact between contact element 140 and the wobble plate.

The valve 100 includes a pair of spaced lands 146 and 148 providing therebetween an annular pressure chamber 150 supplied with hydraulic fluid under pressure from the external conduit 108 and the passage 112. It will be observed that the width of the lands 146 and 148 is just sufficient to cover the ports formed at the inner surface of the valve cylinder 102 by the passages 114 and 116. It will further be observed that the outlet ports formed at the interior of the valve cylinder 102 by the ends of the branch exhaust passages 122 and 124, are positioned directly adjacent the outer sides of the lands 146 and 148.

With the piston 96 and the valve 100 in the position illustrated in FIGURE 3 it will be observed that no flow of hydraulic fluid takes place. The lands 146 and 148 respectively close the ports of the passages 114 and 116 at the inner surface of the valve cylinder. However, if the wobble plate 64 continues its rotation, arm 134 under the influence of the spring 144 will swing in a generally counterclockwise direction. The first result of this swinging motion, before movement of the main piston 96 takes place, is a movement of the valve 100 to the left. Initial movement of the valve 100 to the left shifts the land 146 thereof to the left, thus providing communication between the chamber 150 and the passage 114 with the result that hydraulic fluid under the pressure developed by the pump 22 flows into the cylinder 94 to the left of the piston 96. At the same time, it will be observed that the leftward movement of the valve 100 results in movement of the land 148 to the left, thus uncovering the port at the inner surface of the valve cylinder 102 formed by the passage 116. Thus, hydraulic fluid can flow from the cylinder 94 at the right of the piston 96 through the passage 116 and into the valve cylinder 102 whence it is discharged through the branch passage 124, the outlet passage 118, and conduits 120 and 130. If it be assumed that a limited rotation of the wobble plate 64 takes place after which rotation thereof is terminated, it will be apparent that movement of the piston 96 communicated to the arm 134 will again shift the valve 100 to its intermediate or neutral position. Accordingly, the piston 96 is caused to move in conformity with the movement of the contact element 140. The amount of movement of the servo piston 96 is of course determined by the spacing between the contact point 140 and pivot connection 136 as compared to the spacing between the pivot connection 136 and the pivot connection 138. Accordingly, continuous rotation of the wobble plate 64 which results in continuous back and forth movement of the contact element 140, will result in a timed reciprocating movement of the main piston 96.

It will further be observed that the force which may be exerted by the servo piston 96 is a function only of the pressure of fluid supplied thereto and the area of the piston. On the other hand, the energy contributed by the wobble plate 64 is of a very small value, only sufficient to overcome the spring 144. The arrangement of the spool or piston valve 100 is such that the hydraulic pressures acting thereon are balanced. Accordingly, the plurality of servo motors are capable of delivering a power output of any practical magnitude and at the same time, to be controlled by the relatively light or weak forces available from the delicate speed regulating device 44.

Figures 4, 5:
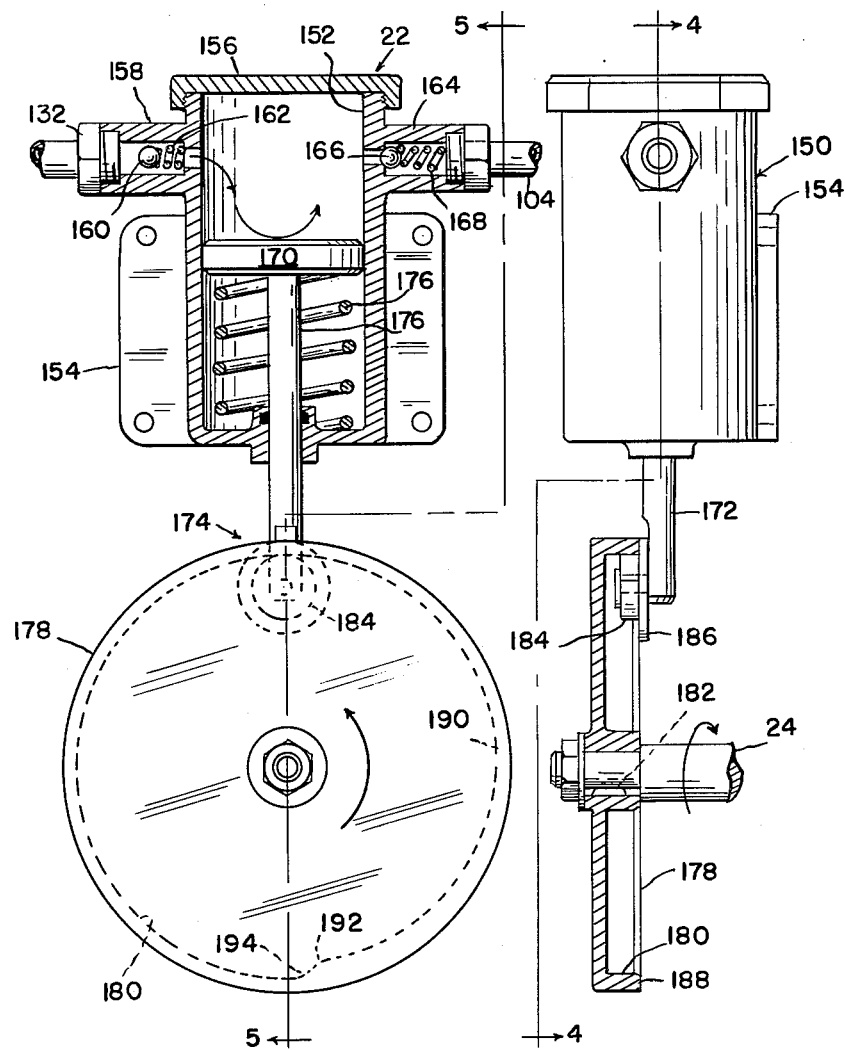
FIGURE 4 is a sectional view of the pump taken along the line 4—4, FIGURE 5.
FIGURE 5 is a side view of the pump, partly in section, taken along the line 5—5, FIGURE 4.

Referring now to FIGURES 4 and 5 there is illustrated a desirable construction of constant pressure variable delivery on demand pump which is indicated diagrammatically at 22 in FIGURE 1. A practical embodiment of this pump comprises a body 150 including a cylinder 152 and mounted flanges 154. The top of the cylinder 152 is illustrated as closed by a removable screw cap 156. The body includes an inlet portion 158 to which the connection 132 is threaded. Received within the inlet portion 158 is a ball check valve 160 biased toward closed position to the left by the compression spring 162. The body is provided with an outlet portion 164 to which the hydraulic fluid supply line 104 is connected for delivery of fluid to the servo motors 66 and 68. Received in the outlet portion 164 is a ball check valve 166 normally urged to the left in seating relation by a compression spring 168. Movable within the cylinder 152 is a pump piston 170 connected by a piston rod 172 to camming mechanism indicated generally at 174. Within the cylinder 152 and beneath the pumping piston 170, as seen in FIGURE 4, is a relatively strong compression spring 176 which urges the piston 170 upwardly in its pumping stroke.

In order to operate the pump there is provided a cam disc 178 having an axially extending flange 180 the inner surface of which constitutes a camming surface. The disc 178 is keyed as indicated at 182 to its drive shaft which may be the shaft 24 shown in FIGURE 1. At its lower end the piston rod 172 is provided with a roller 184 disposed to engage the inner camming surface of the flange 180. Associated with the roller 184 is a larger disc 186 dimensioned to have a flat side thereof engage against the flat end surface 188 of the flange 180.

From an inspection of FIGURE 4 it will be observed that the cam surface at the inner side of the flange 180 includes a gradual rise from a point located approximately at 190 to the point 192, followed by the relatively abrupt drop-off surface 194. The direction of rotation of the cam disc 178 is as indicated by the arrow in FIGURE 4. It will be observed that the cam rise portion occupies approximately 90 degrees of the total 360 degrees circumference of the disc. Thus, during approximately a quarter revolution of the disc 178, the piston 170 is being forced downwardly on a suction stroke against the action of the relatively strong compression spring 176. This suction stroke permits closure of the check valve 166 by a combination of suction and the spring 168. At the same time, the reduction in pressure in the cylinder 152 draws hydraulic fluid into the cylinder, the pressure differential opening the check valve 160 against its spring 162. As soon as the high point 192 of the cam surface passes the roller 184, the spring 176 tends to move the piston 170 upwardly on a pumping stroke and the piston may move upwardly under the influence of this spring to deliver hydraulic fluid to the servo mechanism on demand. It is contemplated that the capacity of the pump 22 is considerably greater than the demand by the servo mechanism so that the suction stroke will in practice, occupy substantially less than 90 degrees of rotation of the cam disc 178. At periods of no demand it will of course be appreciated that the piston 170 will remain stationary and the roller 174 will simply contact the extreme high point of the cam surface during each rotation of the disc 178.

The foregoing arrangement provides a substantially continuous supply of hydraulic fluid under a pressure as determined by the relatively strong compression spring 176 and the pump maintains the hydraulic fluid available at the predetermined constant pressure on demand.

While FIGURES 4 and 5 show only a single piston 170, it will of course be understood that if desired two or more pistons can be included in the pump operated by cam means such that when one piston is on its suction stroke, at least one other piston is available for supplying hydraulic fluid under pressure. Thus, a completely continuous supply of hydraulic fluid under a constant uniform pressure is available on demand.

*Operation*

While operation of the system is believed clear from the foregoing, it will be briefly reviewed for clarity. A single motor, preferably an electric motor of the constant speed type, is provided and is adapted to drive a constant pressure variable demand on delivery hydraulic pump 22, an impeller pump 32, and the input shaft 46 of a low power but highly accurate variable speed transmission 44. The system includes a main drive 92 capable of delivering substantial power which it is desired to control as to speed through the variable speed transmission 44. This is accomplished by providing two or more servo motors 66 and 68 each of which includes a reciprocating piston connected by suitable crank and linkage mechanism to bevel gears 82 and 84 respectively. The bevel gears 82 and 84 mesh with a bevel gear 90 fixedly carried by the main drive shaft 92.

In order to regulate the speed of rotation of the shaft 92 in accordance with the adjusted speed of rotation of the variable speed transmission output shaft 52, camming means in the form of a wobble plate 64 is connected for rotation at a speed determined by the speed of rotation of the shaft 52. Servo motors 66 and 68 include valves 100 the position of which is jointly determined by the position of the power pistons 96 therein and the contact elements 140 which engage the wobble plate shifts the arms 134 in one direction or the other, the corresponding power pistons of the servo mechanisms are actuated in the opposite direction a proportionate amount. Thus, the power pistons reciprocate back and forth in timed relation to rotation of the wobble plate and by virtue of the crank connections to the bevel gearing result in rotation of the main drive shaft 92 at a speed determined by the speed of rotation of the output shaft of the variable speed transmission 44. Moreover, the power supplied through the main drive shaft 92 may be as great as desired, being limited only by the pressure of hydraulic fluid supplied to the servo motors and the areas of the pistons therein. It will of course be appreciated that uniform velocity rotation is obtained for the main drive shaft 92. The uniform rotation of the wobble plate 64 produces a movement of the follower or contact elements 140 which is approximately a simple harmonic motion, which would plot as a sine wave. A similar simple harmonic reciprocating motion is imparted to the piston 96. However, this straight line back and forth reciprocation of the piston 96 is converted to rotary motion through crank mechanism which can convert the simple harmonic reciprocating movement of the piston to uniform rotational movement of the output shaft 92.

Mention is made again of the fact that while in FIGURE 3, only two servo motors are shown and these are shown as 180 degrees out of phase, more than two may be employed if desired so that a more uniform torque may be available at the output shaft 92. If only two servo motors are employed, it is desirable to connect these only 90 degrees out of phase so that when one is passing through the zone in which it delivers minimum power, the other is passing through the zone in which it delivers maximum power.

The drawings and the foregoing specification constitute a description of the improved infinitely variable speed drives in such full, clear, concise and exact terms as to enable any person skilled in the art to practice the invention, the scope of which is indicated by the appended claims.

What I claim as my invention is:

1. Drive mechanism for producing infinitely variable speed regulation at any selected constant speed which comprises a speed regulator of limited power having an output shaft rotatable at a constant selected speed, a servo device having valve means including a movable valve and a reciprocable output member, means mechanically connecting the output shaft of said regulator to said valve, said servo device including follow-up means mechanically connecting said output member to said valve and operable upon movement of said output member to move said valve in a direction opposite to the movement of said valve by said regulator shaft, thereby to produce simple harmonic reciprocation of said member in timed relation to rotation of said output shaft, a drive shaft, and mechanism operatively connecting said member to said drive shaft to convert the simple harmonic reciprocatory movement of said member to constant speed rotation of said drive shaft at a speed bearing a predetermined invariable relationship to the constant speed rotation of the output shaft of said regulator.

2. Mechanism as defined in claim 1 in which the servo device comprises an expansible chamber fluid motor, and means to supply incompressible hydraulic fluid under pressure to said chamber through said valve means.

3. Drive mechanism for producing infinitely variable speed regulation at any selected constant speed which comprises a speed regulator of limited power having an output shaft rotatable at a constant selected speed, a pair of servo devices each having valve means including a movable valve and a reciprocable output member, means mechanically connecting the output shaft of said regulator to said valves, follow-up means mechanically connecting each of said output members to the valve associated therewith and operable upon movement of said output members to move said valves in directions opposite to movement thereof by said regulator shaft, thereby to produce simple harmonic reciprocation of said members in timed relation to rotation of said output shaft, a drive shaft, and mechanism operatively connecting said members to said drive shaft to convert the simple harmonic reciprocatory movement of said members to constant speed rotation of said drive shaft at a speed bearing a predetermined invariable relationship to the constant speed rotation of the output shaft of said regulator.

4. Mechanism as defined in claim 3 in which each of the servo devices comprises an expansible chamber fluid motor, and means to supply incompressible hydraulic fluid under pressure to said chambers through said valve means.

5. Mechanism as defined in claim 3, comprising a wobble plate connected to the output shaft of said regulator and a pair of followers engaged with said plate and each connected to one of said valve means.

6. Drive mechanism for producing infinitely variable speed regulation at any selected constant speed which comprises a speed regulator of limited power having an output shaft rotatable at a constant selected speed, a plurality of servo-motors each comprising a movable member and a movable valve controlling movement of said member, means mechanically connecting the output shaft of said regulator to said valves, follow-up means mechanically connecting each of said members to the valve associated therewith and operable upon movement of said movable member to move said valve in the direction opposite to movement thereof by said regulator shaft, and means operably connecting each of said members to a rotary driver to produce rotation thereof at a constant speed having a predetermined invariable relationship to the constant speed rotation of said output shaft, and a drive shaft operatively connected in positive driving relationship with both of said drivers to be driven thereby.

References Cited by the Examiner
UNITED STATES PATENTS

| | | |
|---|---|---|
| 321,111 | 6/85 | Jenkins. |
| 605,169 | 6/98 | Loretz _____ 91—39 |
| 1,126,899 | 2/15 | Specht et al. _____ 74—44 |
| 2,402,300 | 6/46 | Shimer _____ 60—52 |
| 2,590,014 | 3/52 | Ivanoff et al. _____ 91—36 |
| 2,604,078 | 7/52 | Chelminski _____ 91—413 |
| 2,616,245 | 11/52 | Van Weenen. |
| 2,865,173 | 12/58 | Dickie. |

FOREIGN PATENTS

| | | |
|---|---|---|
| 420,485 | 11/10 | France. |
| 12,669 | 6/49 | Great Britain. |

FRED E. ENGELTHALER, *Primary Examiner.*
BROUGHTON DURHAM, *Examiner.*